US007544903B2

(12) United States Patent
Hamamoto et al.

(10) Patent No.: US 7,544,903 B2
(45) Date of Patent: Jun. 9, 2009

(54) ELECTRONIC BALANCE WITH WINDSHIELD

(75) Inventors: Hiroshi Hamamoto, Kyoto (JP); Kunio Shimauchi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 187 days.

(21) Appl. No.: 11/815,525

(22) PCT Filed: Feb. 3, 2006

(86) PCT No.: PCT/JP2006/301837

§ 371 (c)(1),
(2), (4) Date: Aug. 3, 2007

(87) PCT Pub. No.: WO2006/082915

PCT Pub. Date: Aug. 10, 2006

(65) Prior Publication Data

US 2009/0020341 A1    Jan. 22, 2009

(30) Foreign Application Priority Data

Feb. 4, 2005  (JP)  ............................. 2005-029838
Feb. 4, 2005  (JP)  ............................. 2005-029839

(51) Int. Cl.
   *G01G 21/28* (2006.01)
(52) U.S. Cl. .................................................. 177/180
(58) Field of Classification Search ................ 177/180, 177/181
   See application file for complete search history.

(56) References Cited

U.S. PATENT DOCUMENTS 4,666,005 A * 5/1987 Komoto et al. ............. 177/180
5,058,692 A * 10/1991 Melcher et al. ............ 177/181

FOREIGN PATENT DOCUMENTS

JP       10-19642 A       1/1998
JP    2003-156386 A       5/2003

OTHER PUBLICATIONS

International Search Report of PCT/JP2006/301837, date of mailing Feb. 21, 2006.

* cited by examiner

*Primary Examiner*—Randy W Gibson
(74) *Attorney, Agent, or Firm*—Westerman, Hattori, Daniels & Adrian, LLP.

(57) ABSTRACT

[Problems] To obtain a stable measurement result in both a measuring-out mode and normal mode, and to obtain a weight value eliminating the influence of convection in the windshield.

[Means for Solving Problems] An electronic balance with a windshield 51, the windshield surrounding a measuring pan 53 and having an openable/closable door 52, for averaging measurement data in a response time and obtaining a weight value based on it, the electronic balance including: a door open/close detection sensor 3 for detecting an open/close of the door 52; and a mode changer for switching the measurement mode between a measuring-out mode in which the response time is relatively short when the door 52 is open, and a normal mode in which the response time is relatively long when the door 52 is closed. In addition, in a convection time measurement mode, a convection time period since the door is closed with no sample on the measuring pan 53 until the fluctuation of the measurement data is settled down within a predetermined range is measured and memorized. After the memorized convection time has passed after a sample was put on the measuring pan 53 and the door 52 was closed in a normal measurement mode, the measurement data is averaged in a predetermined response time and the weight value is calculated.

2 Claims, 4 Drawing Sheets

ELECTRONIC BALANCE WITH WINDSHIELD

TECHNICAL FIELD

The present invention relates to an electronic balance with a windshield for preventing the influence of convection and other factors in a measurement environment.

BACKGROUND ART

There are two purposes (ways) to use an electronic balance; one is to measure out a predetermined amount of powders, liquids, and the like (hereinafter called "measuring-out mode"), the other is to weigh one (or plural) mass (hereinafter called "normal mode").

Generally speaking, in the measuring-out mode, the precision of the amount to be measured out is allowed to be less accurate than that of the balance, but the response time should be short. However, when the weight of the amount which was measured out is measured in the normal mode, it is more important to ensure the accuracy of the measurement than to shorten the response time.

Conventional electronic balances show an averaged measurement data from constantly obtained data at certain time intervals corresponding to the response time in order to show a stable weight value. However, the certain time to average the measurement data is intuitively shortened or lengthened by a user in accordance with the measurement mode. Such electronic balances have a measuring room in which a measuring pan is surrounded by a windshield in order to prevent the influence of convection and other factors in a measurement environment. However, due to the door's opening and closing motion, the convection within the windshield can take place after the door is closed. This problem is particularly serious when the balance is a so-called analytical balance with the smallest display of 0.01 mg or 0.001 mg for measuring a small sample amount.

[Patent Document 1] Japanese Unexamined Patent Application Publication No. H10-19642

[Patent Document 2] Japanese Unexamined Patent Application Publication No. 2003-156386

DISCLOSURE OF THE INVENTION

Problem to be Solved by the Invention

As previously described, if users intuitively set the response time for averaging the measurement data, the timing varies. Therefore, it is not uncommon that the optimum measurement result cannot be obtained. In addition, users sometimes read out the measurement result after waiting longer than necessary for averaging, and this leads to a deterioration of operating efficiency because of the unnecessary passage of time.

When switching the above-mentioned measurement modes, users switch them just intuitively based only on the averaging time necessary for each measurement mode, and the time for eliminating the influence of convection in the windshield in response to the open/close state of the door is not considered. Therefore, it is sometimes impossible to obtain a stable measurement result. More specifically, the major factor that destabilizes the measurement when the door is closed is a vibration on the installation site or a subtle breeze flowing from the gaps of a scale, while the major factor that destabilizes the measurement when the door is open is a breeze near the measuring pan generated when a sample is measured out and in other similar situations.

The time required for convection to be stabilized greatly varies depending on the measurement conditions at the moment, such as the temperature of the measuring room, the temperature of the balancing mechanical part under the measuring room, and the environmental temperature where the balance is placed. The convection produces a force to lift up or push down the measuring pan, and the measurement result varies as the force fluctuates.

When using an electronic balance, users want an approximate value quickly displayed and simultaneously want to obtain an accurate measurement result quickly. Therefore, if a user judges that the fluctuation of the measurement value has become within a predetermined fluctuation band, he/she lengthens the response time to obtain a weight value. In this case, the influence of convection gradually decreases and is settled within a predetermined fluctuation band; but, users sometimes wait for a long time until the convection is settled down and the weight value is stabilized; or, on the contrary, immediately read out the weight value which is affected by the convection.

The present invention provides an electronic balance with a windshield capable of obtaining a stable measurement result in both the measuring-out mode and normal mode, or capable of eliminating the influence of convection in the windshield.

Means for Solving the Problems

To solve the above-described problem, the present invention provides an electronic balance with a windshield surrounding a measuring pan and having an openable/closable door for averaging measurement data in a predetermined response time and for obtaining a weight value based on it, the electronic balance including:

a door open/close detector for detecting an open/close of the door; and a mode changer for switching the measurement mode between a measuring-out mode in which the predetermined response time is relatively short when the door is open, and a normal mode in which the predetermined response time is relatively long when the door is closed.

When a measurement is carried out in the measuring-out mode with the aforementioned configuration, the door is necessarily open. Hence, when the door open/close detector detects the open state of the door, the measurement data is averaged in a relatively short response time and the weight value is displayed. In the case the door is closed and a measurement is carried out in the normal mode, when the door open/close detector detects the close state of the door, the measurement data is averaged in a relatively long response time and the weight value is displayed.

In addition, the present invention also includes the above-described electronic balance wherein each of the response times for averaging the measurement data in the normal mode and the measuring-out mode is set to a time, at the very least, capable of eliminating the influence of convection in the windshield which varies depending on the open/close state of the door.

Furthermore, the present invention provides an electronic balance with a windshield, the windshield surrounding a measuring pan and having an openable/closable door, for averaging measurement data in a predetermined response time and obtaining a weight value based on it, the electronic balance including:

a door open/close detector for detecting an open/close of the door;

a convection time measurement mode for measuring and memorizing a convection time period from the time when the door is closed to the time when a fluctuation of the measurement data becomes within a predetermined level; and a normal measurement mode for averaging the measurement data in a predetermined response time to obtain a weight value after the memorized convection time period has passed from the time when a sample is set on the measuring pan and the door is closed.

In addition, the present invention also includes the above-mentioned electronic balance with a windshield including:

a controller for generating a trigger signal at predetermined time intervals, or when a predetermined temperature change or a predetermined humidity change has occurred; and a door controller for automatically opening or closing the door in response to the trigger signal, wherein, when the trigger signal is generated, the door is opened and closed, and the convection time measurement mode is then carried out.

EFFECT OF THE INVENTION

The electronic balance with a windshield according to the present invention averages measurement data in a response time suitable for each measurement mode of the measuring-out mode and normal mode. Therefore, it is possible to obtain a stable measurement result, and operating efficiency is improved because users do not need to wait longer than necessary until they read out a measurement result. In addition, it is possible to eliminate the influence on the measurement result caused by convection and other factors in the windshield.

In particular, since the electronic balance with a windshield which the present invention provides can preliminarily recognize the time when the influence of convection fades which is generated after the door of the windshield is closed, it can display the weight value after waiting neither too long nor too short until the influence of convection fades. Therefore, the electronic balance with a windshield provided has both the accuracy of weight values and the efficiency of operations.

EXPLANATION OF NUMERALS

3 . . . Door Open/Close Detection Sensor
51 . . . Windshield
52 . . . Door
53 . . . Measuring Pan

BEST MODES FOR CARRYING OUT THE INVENTION

Figure 1:
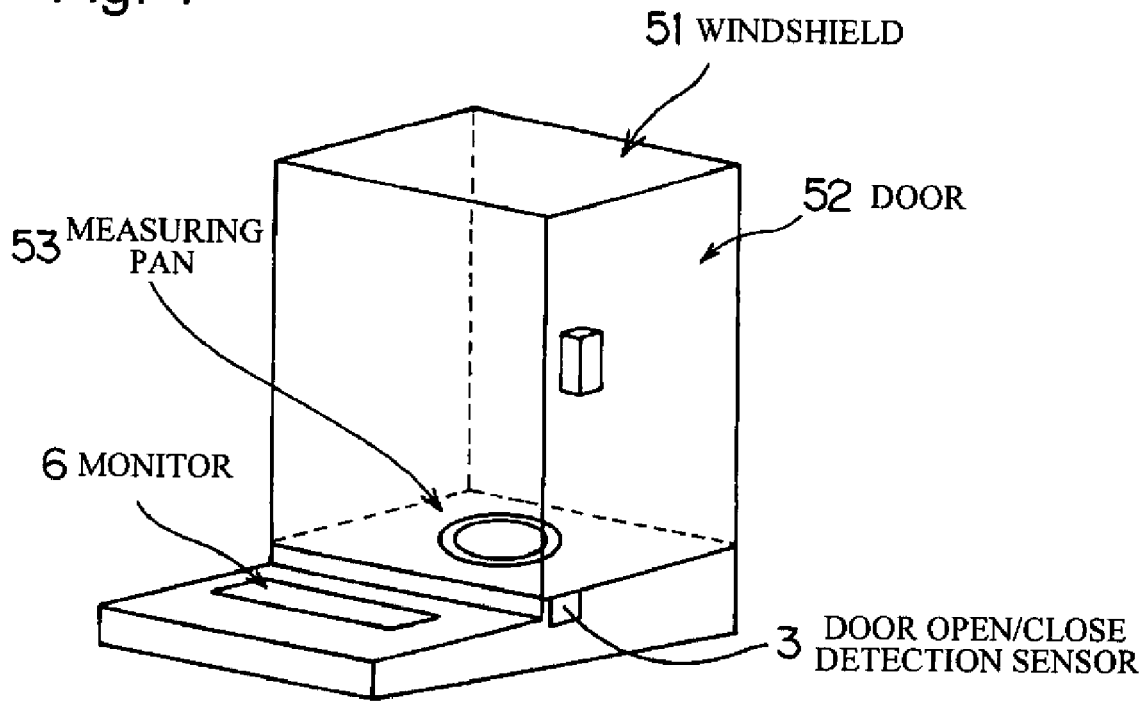
FIG. 1 is a schematic external view of an electronic balance with a windshield according to the present invention.
Figure 2:
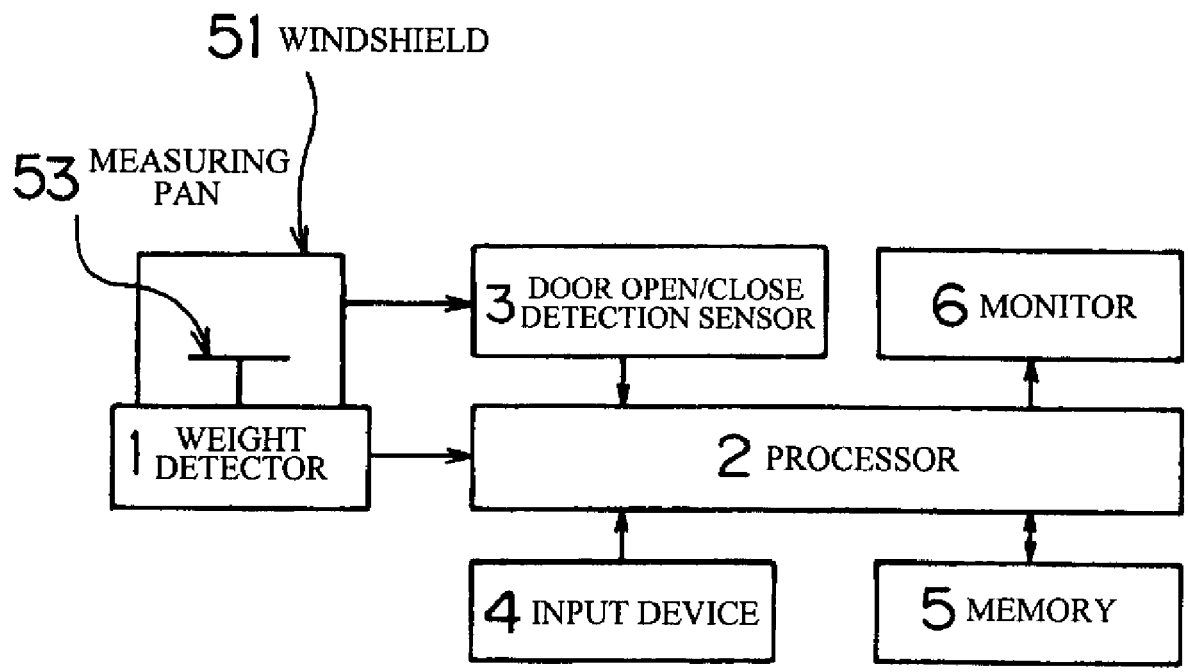
FIG. 2 is a schematic block diagram of an electronic balance with a windshield according to the present invention.
Figure 3:
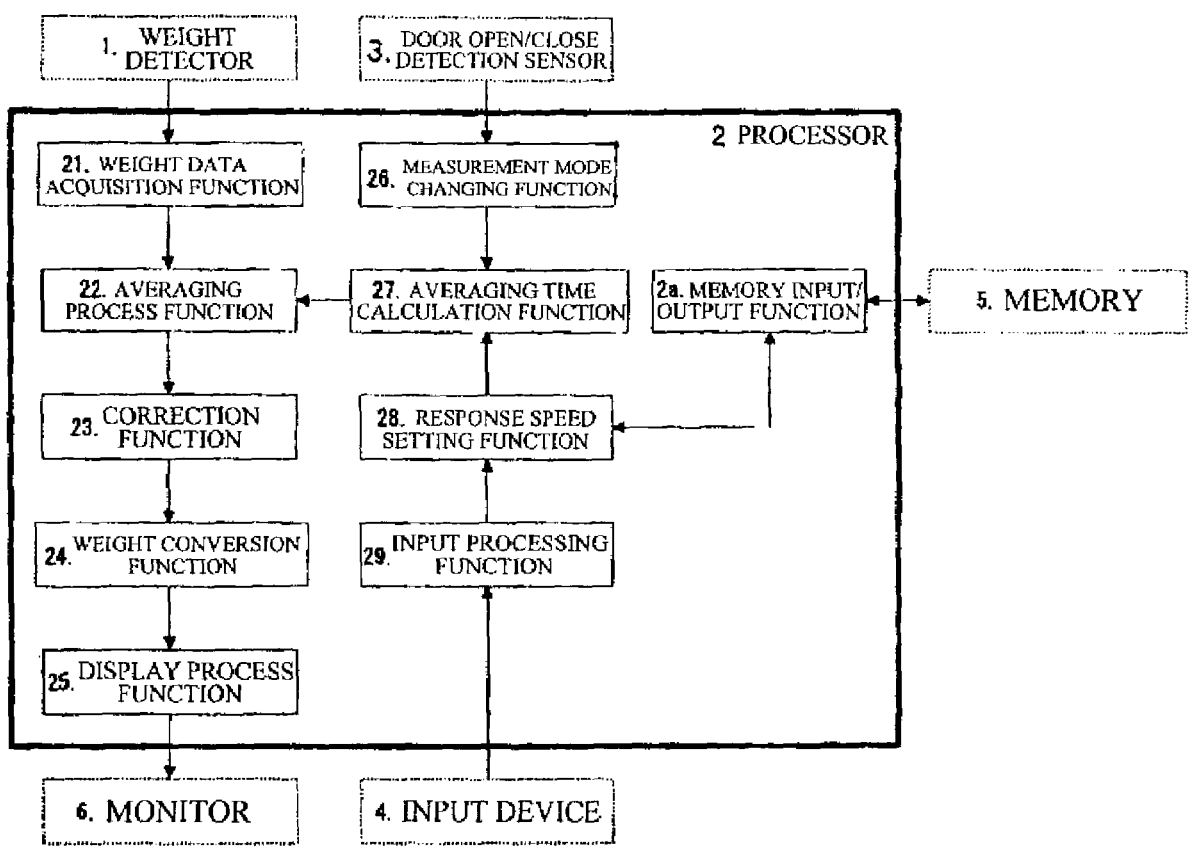
FIG. 3 is a block diagram of the processing function of an electronic balance with a windshield according to the present invention.
Figure 4:
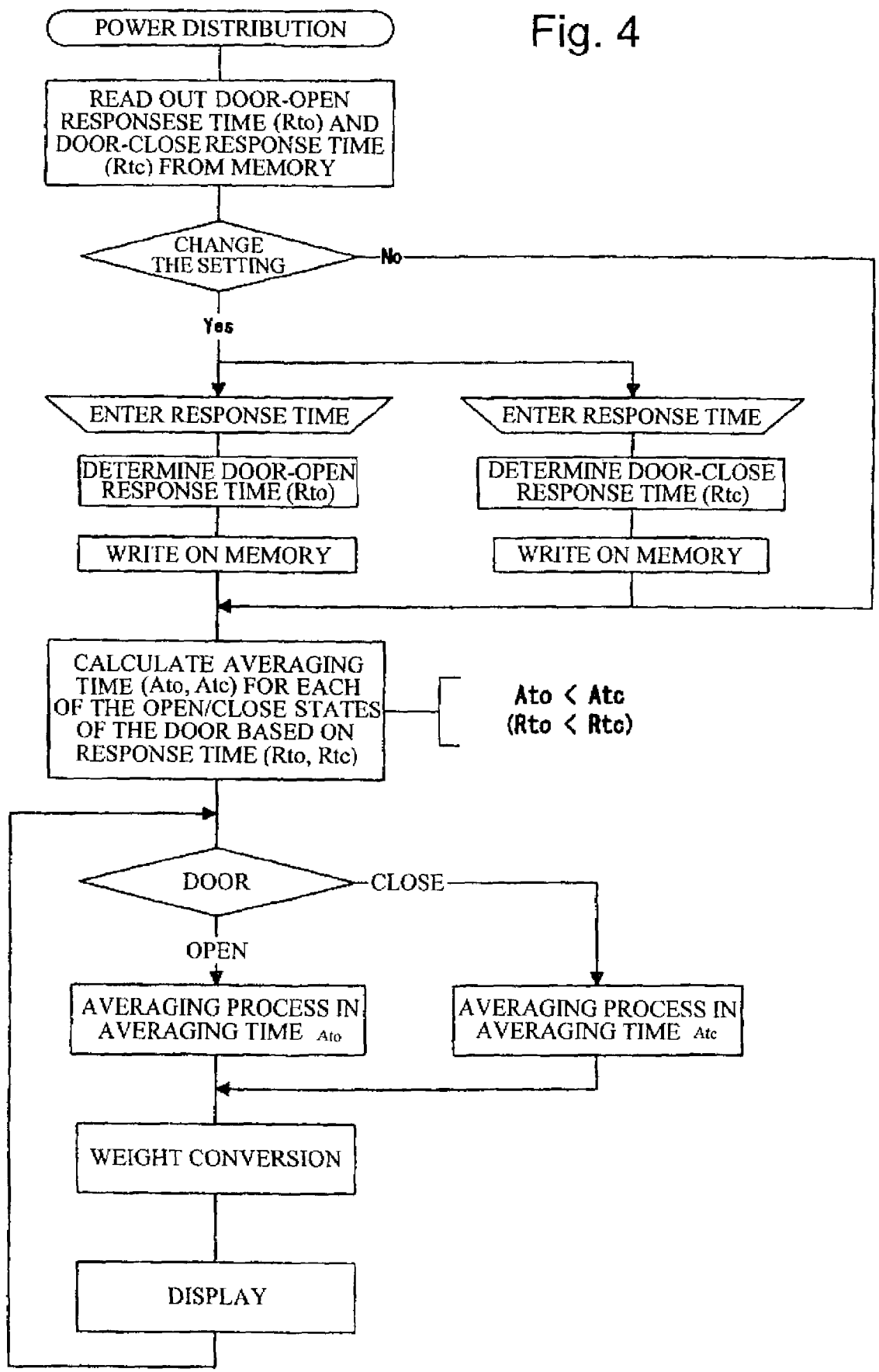
FIG. 4 is a flowchart showing an operation of a first embodiment of an electronic balance with a windshield according to the present invention.

An electronic balance with a windshield which the present invention provides is described hereafter according to a first embodiment shown in FIGS. 1 through 4. FIG. 1 is a schematic external view of an electronic balance with a windshield according to the present invention, FIG. 2 is a schematic block diagram of an electronic balance with a windshield according to the present invention, FIG. 3 is a block diagram of the processing function of an electronic balance with a windshield according to the present invention, and FIG. 4 is a flowchart showing an operation of an electronic balance with a windshield according to the present invention.

The rough configuration of the electronic balance with a windshield is described with reference to FIGS. 1 and 2. A measuring pan 53, which is included in a weight detector 1, for putting a sample on is placed in a windshield 51. The windshield 51 has a door 52, for which a door open/close detection sensor 3 is provided to detect the open/close of the door 52. The numeral 6 indicates a monitor for displaying the weight value.

The weight detector 1 and the door open/close detection sensor 3 are connected to a processor 2. The response times for each state when the door 3 is open and closed are provided through an input device 4 connected to the processor 2, which may be an external input device such as a key switch, personal computer, and external keyboard. The response times are memorized in a memory 5 by way of the processor 2. The monitor 6 displays a weight value in which the load detected by the weight detector 1 is converted to a value by weight.

Next, an operation of this embodiment is described with reference to FIGS. 3 and 4. An operator preliminarily enters predetermined response times for each state when the door 52 is open and closed through the input device 4. These response times are preliminarily obtained by simulating a normal mode and a measuring-out mode to obtain the response times most suitable for each mode and for averaging measurement data. In addition, it is preferable that the response times be obtained in consideration of the time capable of eliminating the influence of convection which is specific to each mode.

The entered data are transferred from an input processing function 29 of the processor 2 to a response speed setting function 28, converted to response time data in a format usable for the averaging process and other processes, and memorized in the memory 5 via a memory input/output function 2a. The response time can be changed according to necessity.

Next, the response time data are transferred from the response speed setting function 28 to an averaging time calculation function 27. The state of the door 52 of the windshield 51 is determined by a measurement mode changing function 26 based on an output from the door open/close detection sensor 3, and the response time, the number of the average data, and other data to be needed are calculated.

Measurement data are obtained by a weight data acquisition function 21 based on an output from the weight detector 1. If the measurement mode changing function 26 judges that the door is open, an averaging process function 27 carries out an averaging process on the measurement data with the averaging time which is calculated based on a response time when the door is open. In a similar way, when it is judged that the door is closed, an averaging process is carried out by the averaging process function 22 with the averaging time which is calculated based on the response time when the door is closed.

Therefore, when the door is open during the measuring-out process, the operator can set a short response time so that the measurement value will be quickly displayed and, accordingly, the workability will be improved. When the door is closed after the measuring-out process is finished, the averaging time is extended, which brings an accurate measurement result. Additionally, it is preferable that the response time be obtained and set in advance in consideration of the time capable of eliminating the influence of convection which is specific to each mode.

After the averaging process by the averaging process function 22, a span correction and other corrections are carried out by a correction function 23. Then a conversion to a weight value is carried out by a weight conversion function 24 and the weight value after the conversion is provided to the monitor 6 by a display process function 25.

A second embodiment is hereinafter described with reference to FIG. 2. This has the function to have the convection time which is calculated by the processor 2 memorized in the memory 5 in response to a direction to perform a convection memory mode entered from the input device 4. In addition, the weight value in which the load detected by the weight detector 1 is converted to a value by weight is displayed on the monitor 6. Or, the monitor 6 shows that the convection memory mode is in execution.

Figure 5:
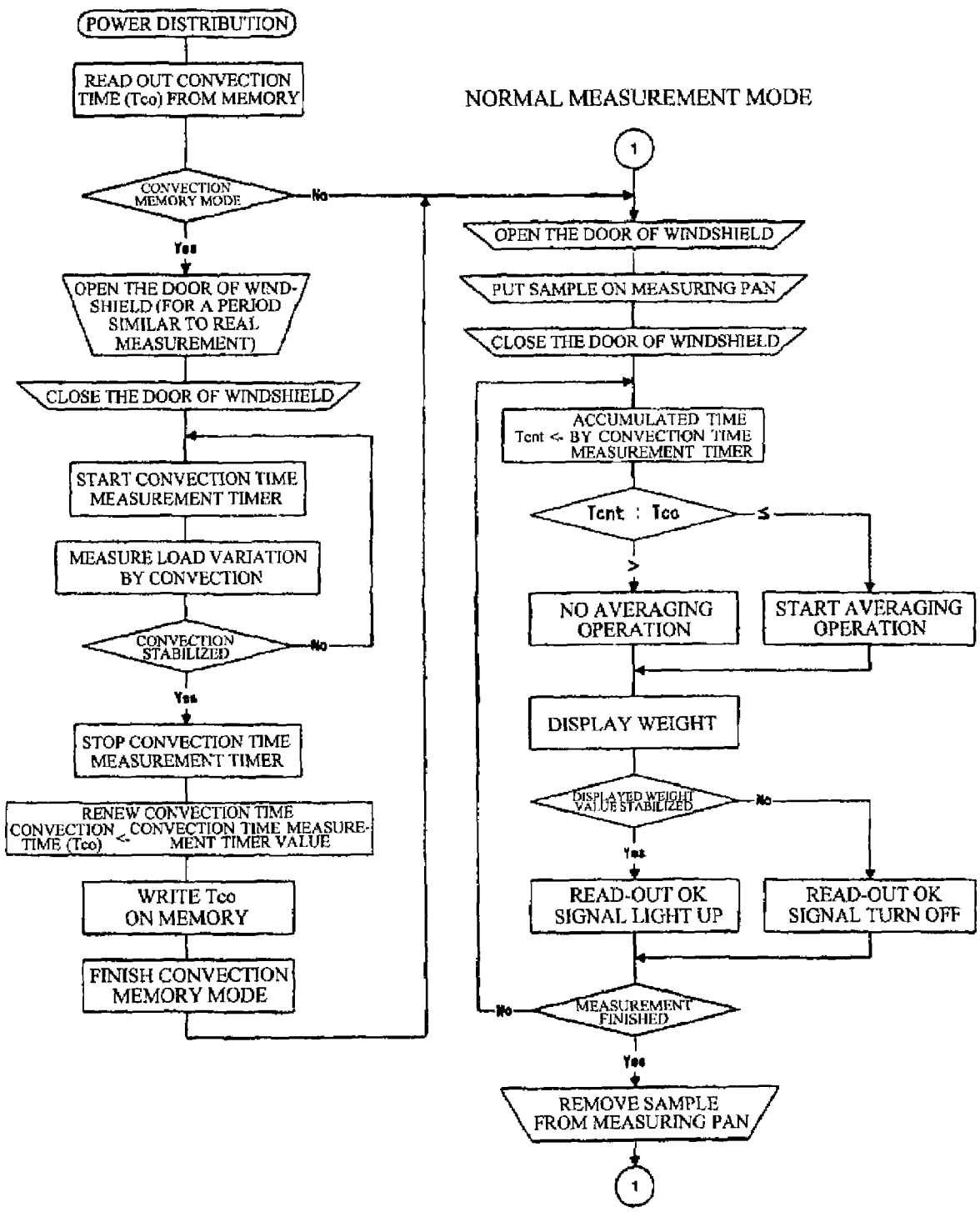
FIG. 5 is a flowchart showing an operation of a second embodiment of an electronic balance with a windshield according to the present invention.

Next, an operation of the second embodiment is described with reference to FIG. 5. First, an operator turns the switch (input device 4) ON to start power distribution to the main body. Then the convection time Tco which was memorized previously is called out from the memory 5. At the same time, it is possible to display information on the usage environment of the time before such as date and time, temperature, humidity, and installation site. From this information, the operator can determine whether or not the convection time should be re-measured.

When the convection time measurement mode is selected, the operator opens the door 52 of the windshield 51 for the time necessary to put a sample for a normal measurement, and then closes the door 52. Immediately after the door 52 is closed, a convection time measurement timer starts to measure the accumulated time. Concurrently, a load variation by convection is measured while the operator monitors the measurement data of the balance.

Then, when it is determined that the fluctuation of the measurement data is stabilized or there is no influence of convection to the measurement data, the convection time measurement timer is stopped, convection time Tco is updated with the measured time, which is memorized in the memory, and the convection time measurement mode is finished.

On the other hand, after the power distribution, when the normal measurement mode is carried out instead of the convection time measurement mode, the operator opens the door 52 of the windshield 51, puts a sample to be measured on the measuring pan 53, and closes the door 52. Immediately after the door 52 is closed, the convection time measurement timer starts counting. The averaging process for the measurement data is not carried out until the elapsed time from the beginning of the measurement reaches the convection time Tco which was read out immediately after the power distribution; that is, until the load variation by convection is settled down.

Then, after the elapsed time from the beginning of the measurement reaches the convection time Tco, the averaging process for the measurement data is carried out and the weight value is displayed. In addition, when the fluctuation of the weight value due to convection and other environmental factors has been eliminated and the weight value is stable, a "read-out OK" signal lights up. Then the operator reads out the weight value and the measurement is finished.

If the weight value is unstable, on the other hand, the "read-out OK" signal does not light up, and the series of operations starting from the counting up by the convection time measurement timer is continued.

In addition, it is possible to automate the operations in the convection time measurement mode as follows: The number of days elapsed since the convection time measurement was carried out last time is counted, and if predetermined days have passed, or the temperature or humidity in the usage environment has changed more than predetermined degrees, a trigger signal is generated to perform a convection time measurement mode. In response to the trigger signal, the door of the windshield is automatically opened and then closed after a predetermined period of time in order to generate convection similar to that generated manually. Then, when it is detected that the load variation due to convection has been reduced within a predetermined range, the convection time Tco is updated with the time elapsed since the door was closed until the convection settled down. By automating the operations in the convection time measurement mode as just described, the renewal of the convention time will be remembered and the fluctuation of the convection time will be evened because the operation of opening and closing the door to generate convection is unified. This results in higher measurement accuracy.

The invention claimed is:

1. An electronic balance with a windshield surrounding a measuring pan and having an openable/closable door for averaging measurement data in a predetermined response time and obtaining a weight value based on it, the electronic balance comprising:
   a door open/close detector for detecting an open/close of the door;
   a convection time measurement mode for measuring and memorizing a convection time period from a time when the door is closed to a time when a fluctuation of the measurement data becomes within a predetermined level; and
   a normal measurement mode for averaging the measurement data in a predetermined response time to obtain a weight value after the memorized convection time period has passed from a time when a sample is set on the measuring pan and the door is closed.

2. The electronic balance with a windshield according to claim 1, comprising:
   a controller for generating a trigger signal at predetermined time intervals, or when a predetermined temperature change or a predetermined humidity change has occurred; and
   a door controller for automatically opening or closing the door in response to the trigger signal,
   wherein, when the trigger signal is generated, the door is opened and closed, and then the convection time measurement mode is carried out.

* * * * *